US008408602B2

(12) United States Patent
Berson

(10) Patent No.: US 8,408,602 B2
(45) **Date of Patent: *Apr. 2, 2013**

(54) LABEL FOR RECEIVING INDICIA HAVING VARIABLE SPECTRAL EMISSIVITY VALUES

(76) Inventor: William Berson, Weston, CT (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/185,722

(22) Filed: Aug. 4, 2008

(65) Prior Publication Data

US 2008/0282593 A1 Nov. 20, 2008

Related U.S. Application Data

(63) Continuation of application No. 10/824,975, filed on Apr. 14, 2004, now Pat. No. 7,407,195.

(51) Int. Cl.
*B42D 15/00* (2006.01)
*G06K 7/10* (2006.01)
*G06K 7/14* (2006.01)
*G06K 19/06* (2006.01)

(52) U.S. Cl. ....... 283/85; 283/91; 235/491; 235/462.01; 235/454

(58) Field of Classification Search .................... 283/85, 283/91, 92; 235/491
See application file for complete search history.

(56) References Cited

U.S. PATENT DOCUMENTS 3,239,815 A 3/1966 Martens
3,245,697 A 4/1966 Nugent
3,455,577 A 7/1969 Kikumoto
3,468,046 A 9/1969 Makishima
3,477,156 A 11/1969 Naito
3,536,894 A 10/1970 Travioli
3,621,249 A 11/1971 Kikumoto
3,640,009 A 2/1972 Komiyama
3,802,101 A 4/1974 Scantlin
3,829,662 A 8/1974 Furahashi
3,891,829 A 6/1975 Dobras
(Continued)

FOREIGN PATENT DOCUMENTS

AU 743 556 B2 1/2002
EP 0535881 4/1993
(Continued)

OTHER PUBLICATIONS

"Thermoelectric Module System Design," INB Products, Inc., http://www.inbthermoelectric.com/design.html, Erwin St., Van Nuys, CA 91411, pp. 1-3., accessed on Jul. 12, 2004.

(Continued)

*Primary Examiner* — Dana Ross
*Assistant Examiner* — Kyle Grabowski
(74) *Attorney, Agent, or Firm* — Kramer Levin Naftalis & Frankel LLP

(57) ABSTRACT

Labels that are conducive to the detection of bar-codes and other indicia having varying spectral emissivity values are provided. The labels include a substrate, a background layer, a thermally conductive layer and an adhesive layer. The background layer is preferably similar in visual appearance to the indicium that the label is to receive. Meanwhile, the thermally conductive layer is made from a material with high thermal conductivity that is used to substantially equalize the temperature across the label surface, thereby enabling a faster and cheaper detection of transitions of differential emissivity on the indicium surface. The adhesive layer is used for attaching the label to a document or other product.

28 Claims, 4 Drawing Sheets

U.S. PATENT DOCUMENTS

| | | | | |
|---|---|---|---|---|
| 3,918,029 | A | 11/1975 | Lemelson | |
| 3,919,447 | A | 11/1975 | Kilmer, Jr. et al. | |
| 4,044,231 | A | 8/1977 | Beck et al. | |
| 4,210,916 | A | 7/1980 | Mansukhani | |
| 4,264,366 | A | 4/1981 | Peng | |
| 4,312,915 | A | 1/1982 | Fan | |
| 4,359,633 | A | 11/1982 | Bianco | |
| 4,417,822 | A | 11/1983 | Stein et al. | |
| 4,521,861 | A | 6/1985 | Logan et al. | |
| 4,529,633 | A | 7/1985 | Karlsson | |
| 4,530,961 | A | 7/1985 | Nguyen et al. | |
| 4,625,101 | A | 11/1986 | Hinks et al. | |
| 4,627,819 | A | 12/1986 | Burrows | |
| 4,647,774 | A | 3/1987 | Brisk et al. | |
| 4,647,775 | A | 3/1987 | Stein | |
| 4,708,493 | A | 11/1987 | Stein | |
| 4,840,496 | A | 6/1989 | Elleman et al. | |
| 4,840,674 | A | 6/1989 | Schwarz | |
| 4,888,475 | A * | 12/1989 | Mullenmeister | 283/91 |
| 4,889,367 | A | 12/1989 | Miller | |
| 4,910,185 | A | 3/1990 | Stake et al. | |
| 4,919,542 | A | 4/1990 | Nulman et al. | |
| 5,036,099 | A | 7/1991 | Allen | |
| 5,155,080 | A | 10/1992 | Elder et al. | |
| 5,166,080 | A | 11/1992 | Schietinger et al. | |
| 5,184,148 | A | 2/1993 | Suga et al. | |
| 5,259,907 | A | 11/1993 | Soules et al. | |
| 5,281,261 | A | 1/1994 | Lin | |
| 5,282,017 | A | 1/1994 | Kasindorf et al. | |
| 5,294,198 | A | 3/1994 | Schlagheck | |
| 5,296,887 | A | 3/1994 | Zander | |
| 5,308,161 | A | 5/1994 | Stein | |
| 5,315,098 | A | 5/1994 | Tow | |
| 5,393,148 | A | 2/1995 | Berson | |
| 5,401,960 | A | 3/1995 | Fisun et al. | |
| 5,460,451 | A | 10/1995 | Wadman | |
| 5,568,177 | A | 10/1996 | Talvalkar et al. | |
| 5,568,555 | A | 10/1996 | Shamir et al. | |
| 5,571,311 | A | 11/1996 | Belmont et al. | |
| 5,582,103 | A | 12/1996 | Tanaka et al. | |
| 5,597,237 | A | 1/1997 | Stein | |
| 5,597,997 | A | 1/1997 | Obata | |
| 5,648,650 | A | 7/1997 | Sugifune et al. | |
| 5,653,844 | A | 8/1997 | Abrams | |
| 5,686,725 | A | 11/1997 | Maruyama et al. | |
| 5,701,538 | A | 12/1997 | Yasui | |
| 5,704,712 | A | 1/1998 | Stein | |
| 5,709,918 | A | 1/1998 | Kimijima et al. | |
| 5,814,806 | A | 9/1998 | Tanaka et al. | |
| 5,861,618 | A | 1/1999 | Berson | |
| 5,906,678 | A | 5/1999 | Fujiyama et al. | |
| 5,908,527 | A | 6/1999 | Abrams | |
| 5,963,662 | A | 10/1999 | Vachtsevanos et al. | |
| 5,971,276 | A | 10/1999 | Sano et al. | |
| 5,973,598 | A | 10/1999 | Beigel | |
| 5,981,040 | A | 11/1999 | Rich et al. | |
| 6,001,510 | A | 12/1999 | Meng et al. | |
| 6,019,865 | A | 2/2000 | Palmer et al. | |
| 6,025,926 | A | 2/2000 | Smith et al. | |
| 6,027,027 | A | 2/2000 | Smithgall | |
| 6,039,257 | A | 3/2000 | Berson et al. | |
| 6,069,190 | A | 5/2000 | Bates et al. | |
| 6,095,682 | A | 8/2000 | Hollander et al. | |
| 6,104,291 | A | 8/2000 | Beauvillier et al. | |
| 6,123,263 | A | 9/2000 | Feng | |
| 6,130,613 | A | 10/2000 | Eberhardt et al. | |
| 6,168,081 | B1 | 1/2001 | Urano et al. | |
| 6,191,851 | B1 | 2/2001 | Kirkham et al. | |
| 6,203,069 | B1 | 3/2001 | Outwater et al. | |
| 6,246,326 | B1 | 6/2001 | Wiklof et al. | |
| 6,255,948 | B1 | 7/2001 | Wolpert et al. | |
| 6,271,793 | B1 | 8/2001 | Brady et al. | |
| 6,274,873 | B1 | 8/2001 | Outwater et al. | |
| 6,280,069 | B1 | 8/2001 | Pastrick et al. | |
| 6,280,544 | B1 | 8/2001 | Fox | |
| 6,294,998 | B1 | 9/2001 | Adams et al. | |
| 6,299,346 | B1 | 10/2001 | Ish-Shalom et al. | |
| 6,309,690 | B1 | 10/2001 | Brogger et al. | |
| 6,335,686 | B1 | 1/2002 | Goff et al. | |
| 6,352,751 | B1 | 3/2002 | Miles | |
| 6,354,501 | B1 | 3/2002 | Outwater et al. | |
| 6,355,598 | B1 | 3/2002 | Takeda et al. | |
| 6,471,126 | B2 | 10/2002 | Urano et al. | |
| 6,481,907 | B2 | 11/2002 | Banach et al. | |
| 6,486,783 | B1 | 11/2002 | Hauslade et al. | |
| 6,508,399 | B2 | 1/2003 | Sasaki et al. | |
| 6,514,367 | B1 | 2/2003 | Leighton | |
| 6,543,808 | B1 | 4/2003 | Mitchell et al. | |
| 6,549,176 | B2 | 4/2003 | Hausladen | |
| 6,557,758 | B1 | 5/2003 | Monico | |
| 6,561,422 | B1 | 5/2003 | Cariffe | |
| 6,576,155 | B1 | 6/2003 | Barbera-Guillem | |
| 6,593,853 | B1 | 7/2003 | Barrett et al. | |
| 6,610,351 | B2 | 8/2003 | Shchegolik et al. | |
| 6,610,386 | B2 | 8/2003 | Williams et al. | |
| 6,612,494 | B1 | 9/2003 | Outwater | |
| 6,662,430 | B2 | 12/2003 | Brady et al. | |
| 6,669,093 | B1 | 12/2003 | Meyerson et al. | |
| 6,677,917 | B2 | 1/2004 | Van Heerden et al. | |
| 6,685,094 | B2 | 2/2004 | Cameron et al. | |
| 6,693,541 | B2 | 2/2004 | Egbert | |
| 6,700,491 | B2 | 3/2004 | Shafer | |
| 6,701,605 | B2 | 3/2004 | Huffer et al. | |
| 6,702,185 | B1 | 3/2004 | Zercher | |
| 6,712,272 | B2 | 3/2004 | Urano et al. | |
| 6,741,178 | B1 | 5/2004 | Tuttle | |
| 6,752,430 | B2 | 6/2004 | Holt et al. | |
| 6,784,761 | B2 | 8/2004 | Takeda et al. | |
| 6,793,138 | B2 | 9/2004 | Saito | |
| 6,857,573 | B2 | 2/2005 | Urano et al. | |
| 6,857,714 | B2 | 2/2005 | Hohberger et al. | |
| 6,874,639 | B2 | 4/2005 | Lawandy | |
| 7,038,276 | B2 | 5/2006 | Ker et al. | |
| 7,038,766 | B2 | 5/2006 | Kerns et al. | |
| 7,044,386 | B2 | 5/2006 | Berson | |
| 7,079,230 | B1 | 7/2006 | McInerney et al. | |
| 7,093,767 | B2 | 8/2006 | Faenza et al. | |
| 7,102,520 | B2 | 9/2006 | Liu et al. | |
| 7,172,670 | B2 | 2/2007 | Franko | |
| 7,242,996 | B2 | 7/2007 | Roesner | |
| 7,261,479 | B2 | 8/2007 | Barrus et al. | |
| 7,267,285 | B2 | 9/2007 | Berson | |
| 7,407,195 | B2 | 8/2008 | Berson | |
| 7,619,520 | B2 | 11/2009 | Berson | |
| 7,621,451 | B2 | 11/2009 | Berson | |
| 7,648,074 | B2 * | 1/2010 | Attenberger et al. | 283/92 |
| 7,651,031 | B2 | 1/2010 | Berson | |
| 2001/0024160 | A1 | 9/2001 | Banach et al. | |
| 2001/0030628 | A1 | 10/2001 | Brady et al. | |
| 2001/0048028 | A1 | 12/2001 | Sasaki | |
| 2002/0054201 | A1 | 5/2002 | Takeda et al. | |
| 2002/0056756 | A1 | 5/2002 | Cameron et al. | |
| 2002/0134842 | A1 | 9/2002 | Brunet | |
| 2003/0006170 | A1 | 1/2003 | Lawandy | |
| 2003/0014288 | A1 | 1/2003 | Clarke et al. | |
| 2003/0062119 | A1 | 4/2003 | Hohberger et al. | |
| 2003/0146288 | A1 | 8/2003 | Berson | |
| 2004/0070503 | A1 | 4/2004 | Monahan | |
| 2004/0141790 | A1 | 7/2004 | Waters | |
| 2004/0175515 | A1 | 9/2004 | Lawrence et al. | |
| 2004/0175548 | A1 | 9/2004 | Lawrence et al. | |
| 2004/0175550 | A1 | 9/2004 | Lawrence et al. | |
| 2004/0200061 | A1 | 10/2004 | Coleman et al. | |
| 2004/0215350 | A1 | 10/2004 | Roesner | |
| 2005/0035924 | A1 | 2/2005 | Liu et al. | |
| 2005/0230962 | A1 | 10/2005 | Berson | |
| 2006/0086803 | A1 | 4/2006 | Berson | |
| 2006/0127154 | A1 | 6/2006 | Barrus et al. | |
| 2006/0163363 | A1 | 7/2006 | Berson | |
| 2006/0170436 | A1 | 8/2006 | Berson | |
| 2006/0170557 | A1 | 8/2006 | Berson | |
| 2006/0171756 | A1 | 8/2006 | Berson | |
| 2006/0171757 | A1 | 8/2006 | Berson | |
| 2007/0009732 | A1 | 1/2007 | Tsai et al. | |

FOREIGN PATENT DOCUMENTS

| | | |
|---|---|---|
| EP | 0697673 | 2/1996 |
| JP | 9-161002 | 6/1997 |
| WO | WO 00/16278 | 3/2000 |

OTHER PUBLICATIONS

"Thermopile Module Low Cost Non Contact Temperature Measurement Technical Data," www.bnbopto.co.kr/sensors/tps/technicaldata1.htm, pp. 1-9, accessed on Oct. 6, 2004.

"Understanding Thermopile Infrared Sensors," B+B Corporation South Korea, copyright 2000, www.bnbopto.co.kr/sensors/typs/typs-infor.htm, pp. 1-5., accessed on Jul. 12, 2004.

Fraser III, John A., "The use of Encrypted, Coded and Secret Communications is an Ancient Liberty Protected by the United States Constitution," Virginia Journal of Law and Technology, University of Virgina, vol. 2, Fall 1997.

"Application Note Radiometric Temperature: Concepts and Solutions," Santa Barbara Infrared, Inc., 30 South Calle Cesar Chavez, Suite D, Santa Barbara, CA, www.SBIR.com.

"Automatic Identification and Data Capture," Bear Stearns & Co., Inc., pp. 1-74, Jun. 2003.

"Hitachi Develops RFID Chip for Bank Notes, Documents," IDG News Service, www.IDG.net, pp. 1-6., accessed on Oct. 12, 2006.

"RFID Antennas Webpage of Graphic Solutions International LLC," http://www.grpahicssolutionsinc.com/rfid.htm.

"Thermoelectric Module System Design," INB Products, Inc., http://www.inbthermoelectric.com/thermo.html, Erwin St., Van Nuys, CA 91411, p. 1, accessed on Jul. 12, 2004.

"World RFID-based Application Markets-A686-11," Frost & Sullivan, Palo Alto, California, 2004.

Collins, Jonathan, "The Cost of Wal-Mart's RFID Edict," RFID Journal, http://www.rfidjournal.com/article/articleview/572/1/1, Sep. 10, 2003.

Lee, Youbok, Ph.D., "RFID Tag and COB Development Guide with Microship's RFID Devices,(AN830)" Microchip Technology, Inc., pp. 1-25, 2002.

Morley, Gearoid, "Radio Frequency ID Tags," Automation Research Centre, University of Limerick, Aug. 2003.

Reynolds, Matt, "The Physics of RFID," ThingMagic LLC.

Roberti, Mark, "$10K and No Takers," RFID Journal, http://www.rfidjournal.com/article/articleview/1270/1/2, Dec. 6, 2004.

Roberti, Mark, "Sticker Shock," RFID Journal, http://www.rfidjournal.com/article/articleview/1002/1/2, Jun. 28, 2004.

Roeser and Weasel, "Handbook of Chemistry and Physics," Chemical Rubber Company, 49th Edition, 1968, pp. E-228 and F-76.

Shulman, David, "An Annotated Bibliography of Cryptography," New York, London: Garland Publishing Co., pp. 6-13.

Wilkens, John, "Mercury, or the Secret and Swift Messenger," Kessinger Publishing, Chapter V, pp. 37-41.

Yoshida, Junko, "Euro Bank Notes to Embed RFID Chips by 2005," EE Times, pp. 1-6, Dec. 19, 2001.

* cited by examiner

LABEL FOR RECEIVING INDICIA HAVING VARIABLE SPECTRAL EMISSIVITY VALUES

CROSS-REFERENCE TO RELATED APPLICATION

This is a continuation of commonly-assigned U.S. patent application Ser. No. 10/824,975, filed Apr. 14, 2004, now U.S. Pat. No. 7,407,195, which is fully incorporated herein by reference.

BACKGROUND OF THE INVENTION

This invention relates to labels. More particularly, this invention relates to secure, machine readable labels that are conducive to the detection of bar-codes and other types of markings, or indicia, that have varying spectral emissivity values.

Various marking techniques have been used for identification and authentication purposes. For example, machine-readable codes (e.g., bar-codes) and other types of indicia have been used to attach important information to documents and other types of products such as clothing, accessories and the like. The information provided by these machine-readable codes has typically included the origin, authorship, history, ownership and/or other features of the product to which the code is attached. In the case of envelopes or packages to be mailed, for example, bar-codes have been used to provide evidence of proper postage paid. Meanwhile, for example, pricing information has been embedded in bar-codes used in the case of retail product labeling.

As protection against counterfeiting has become an increased concern, moreover, the use of various types of "invisible" marking techniques has became much more prevalent. For example, indicia that uses ultraviolet (UV) and infrared (IR) inks have become widely used. One benefit of using these types of inks is that they are typically not visible when illuminated with light in the visible spectrum (i.e., about 400-700 nm), but are visible when illuminated with light in the UV spectrum and IR spectrum, respectively. Thus, as with the other types of "invisible" indicia, an individual is unable to tell whether the product contains a security mark by merely looking at the product with the naked eye. Similarly, magnetic materials which are detected through their perturbation of a magnetic field have also been used.

Despite the early success of the above-described types of indicia, they have become more vulnerable to copying, alterations and counterfeiting as a result of technological advancements. For example, indicia using UV ink are easily detected through the interaction of the ink with radiation. In addition to mere detection, moreover, indicia using UV inks have proven to be susceptible to copying, alterations and counterfeiting (e.g., through the use of conventional office products).

An alternate type of indicium that is more related to the present invention is disclosed in commonly owned, co-pending U.S. patent application Ser. No. 10/355,670, filed Feb. 1, 2003, entitled "Information Encoding On Surfaces By Varying Spectral Emissivity," which is hereby incorporated by reference in its entirety. This type of indicium is implemented by modifying a surface such that it has varying emissivity values, where emissivity is the ability of the given surface to emit radiant energy compared to that of a black body at the same temperature and with the same area. For example, at least two patterns that differ in spectral emissivity by known amounts are used to form a machine-readable code or other type of marking that can be detected (and/or decoded) through the use of a scanner (e.g., a laser spot scanner or an active laser pyrometer) that is capable of detecting emissivity differentials. In general, these patterns are preferably indistinguishable from their surroundings. Moreover, even when visible, the emissivity values of the patterns are not subject to duplication by standard office equipment. As such, they are less susceptible to counterfeiting, and can be used more reliably for identification and authentication purposes.

Current labels that may receive bar-codes or other types of markings (e.g., those types of markings described in U.S. patent application Ser. No. 10/355,670), however, are often not adequate. For example, the color and the patterns of the inks used in making a marking are often visible to the naked eye when applied to current labels. As such, it becomes extremely difficult to provide a document or other product with a hidden security marking.

Additionally, current labels are not designed to enable fast, accurate and cheap detection of transitions of differential emissivity for a marking that uses varying spectral emissivity values. For example, the presence of temperature variations along the surface of existing labels often makes the use of more expensive and time consuming scanning equipment necessary given that, in this case, measuring levels of radiated thermal energy alone may not be sufficient to obtain accurate measurements of emissivity values. Additionally, such temperature variations also increase the likelihood that the detection of transitions of differential emissivity will be subject to errors.

In view of the foregoing, it is an object of this invention to provide a machine readable label for receiving indicia having variable spectral emissivity values that alleviate the above and other problems associated with existing labels.

SUMMARY OF THE INVENTION

These and other objects of the present invention are accomplished in accordance with the principles of the present invention by providing a label that enables placement of hidden indicia having varying spectral emissivity values and that is conducive to the detection of transitions of differential emissivity.

The labels constructed in accordance with the principles of the present invention include a substrate, which can be either separately attached to, or a part of, the document or product to which the label is to be used with. Additionally, the labels also include a background layer and a thermally conductive layer. The background layer is preferably similar in visual appearance to the indicium that the label is to receive, such that the indicium is indistinguishable from the remainder of the label and/or the document or other product that the label is being used with.

The thermally conductive layer, meanwhile, is made from a material with high thermal conductivity, and is used to substantially equalize the temperature across the label surface. In this manner, the labels are resistant to temperature variations and thereby facilitate the faster and cheaper detection of transitions of differential emissivity on the indicium surface.

Moreover, in various embodiments of the present invention, the label includes an adhesive layer for attaching the label to a document or other product. Meanwhile, in other embodiments in which the substrate is a part of the document or the product, for example, the adhesive layer is not necessary.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which.

DETAILED DESCRIPTION OF THE INVENTION

Figure 1:
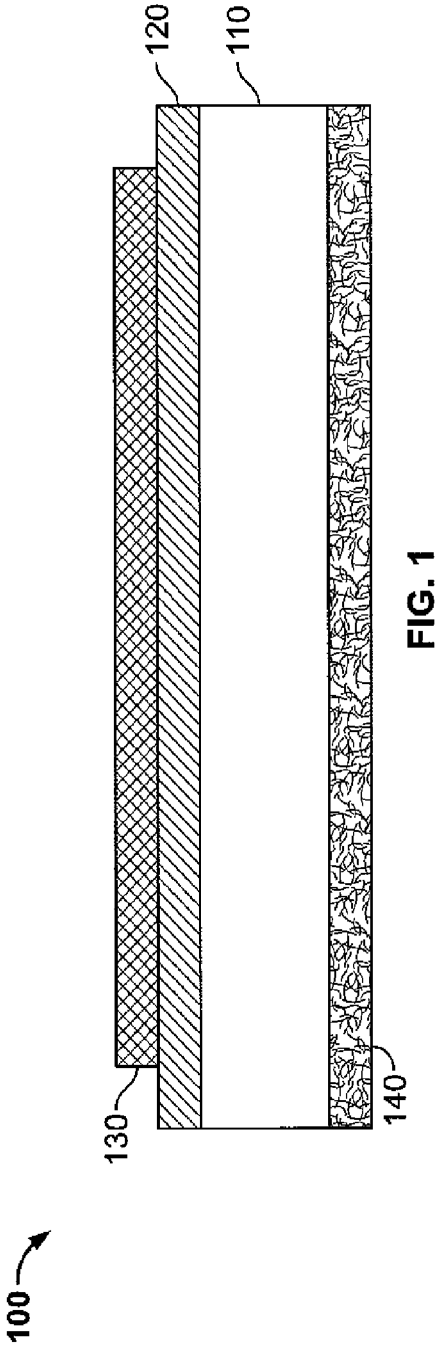
FIG. 1 is a cross-sectional side view of one embodiment of a secure, machine readable label constructed in accordance with the principles of the present invention.

FIG. 1 is a cross-sectional side view of one embodiment of a secure, machine readable label 100 constructed in accordance with the principles of the present invention. As explained in greater detail below, label 100 may be applied to a document or other product, and is adapted to receive and facilitate the detection of invisible (or visible) indicia having variable spectral emissivity values.

Label 100 includes substrate 110, thermally conductive layer 120, background layer 130 and adhesive layer 140. Substrate 110 can be made, for example, from paper, plastic, tyvec, a metallic film or a metallic foil. Persons skilled in the art will appreciate, however, that substrate 110 can be made from any suitable material, and that the invention is not limited in this manner.

Substrate 110 can be either physically separate from, or integral to, the document or product to which label 100 is applied. For example, in various embodiments of the present invention, substrate 110 may be manufactured separately from the document or product(e.g., label 110 can be completely constructed prior to its application to a document or other product).

It is also contemplated that, in alternate embodiments of the present invention, substrate 110 of article 100 can be manufactured together with, or a part of, the document or product it is to be used with (in which case, as explained below, adhesive layer 140 may not be necessary). For example, the material from a paper document or a mail piece (e.g., a mailing envelope) may be used as the substrate of label 100.

As described above, label 100 also includes thermally conductive layer 120. Thermally conductive layer 120 can be made from, for example, a metallic foil or a layer of metallic ink. In a preferred embodiment, thermally conductive layer 120 includes a 0.5 mil adhesive-backed copper foil. It will nonetheless be understood that thermally conductive layer 120 can be made from any material with high thermal conductivity.

The purpose of thermally conductive layer 120 is to substantially equalize the temperature of label 100 across the surface of background layer 130 (or, when background layer 130 is not present, the surface of the applied indicium having variable spectral emissivity values). In particular, label 100 is intended to simplify the detection and scanning process of the indicium applied to label 100 by equalizing the temperature of the scanned area. Namely, by equalizing the surface temperature of label 100, thermally conductive layer 120 ensures that apparent differences in surface temperature as detected by a pyrometer, or other thermal sensor arrangement, are in fact differences in thermal emissivity and therefore contain information that is intended to be conveyed by the indicium that is applied to label 100.

Thermally conductive layer 120 can be applied in advance to substrate 110. Alternatively, thermally conductive layer 120 can be applied just prior to, or substantially simultaneously with, the application of an indicium onto label 100. For embodiments of the present invention in which thermally conductive layer 120 is applied substantially simultaneously with an indicium to substrate 110, thermally conductive layer 120 can be, for example, a layer of ink with high metallic content. For example, thermally conductive layer 120 can be an ink with high copper content, which after drying preferably leaves a layer of 85% or more pure copper.

Moreover, persons skilled in the art will appreciate that, although thermally conductive layer 120 is shown to reside on top of substrate 110 in FIG. 1, the invention is not limited in this manner. In particular, thermally conductive layer 120 can also be applied below substrate 110 (e.g., between substrate 110 and adhesive layer 140, if present). Additionally, when transparent, thermally conductive layer 120 can be located on top of background layer 130 (if present), or alternatively, on top of the printed indicium (not shown in FIG. 1). An example of this embodiment of the present invention would be an indium-tin-oxide ink layer placed on top of background layer 130, or on top of (or around the boundary of) the indicium applied to label 100.

It is also contemplated that thermally conductive layer 120 be excluded from label 100 in various embodiments of the present invention. For example, when label 100 receives indicia having relatively large emissivity differentials, the need for a substantially equalized surface temperature is reduced. In these cases, or in cases where substrate 120 provides adequate equalization of surface temperature, for example, thermally conductive layer 120 may not be necessary. Additionally, thermally conductive layer 120 can also be incorporated into background layer 130 (which is described below) by using a material that has both the desired thermal and optical properties.

As described above and shown in FIG. 1, label 100 further includes background layer 130. In various embodiments of the present invention, the indicium applied to label 100 is situated on top of background layer 130. For this reason, background layer 130 preferably has a visual appearance that is identical to, or at least substantially similar to, that of the indicium that is applied to label 100. In this manner, the optical properties of background layer 130 can prevent the applied indicium from being recognized or observed by the naked eye. Namely, the applied indicia and background layer 130 appear to the eye as a featureless area of uniform color and appearance with no discernable features.

It will be understood that, in various embodiments of the present invention, background layer 130 may be excluded. For example, in cases where the applied indicium has similar optical properties to substrate 120, background layer 130 may not be necessary to “hide” the indicium. Furthermore, it is also contemplated that label 100 receives an indicium that remains resistant to both copying and alteration by standard office equipment, but that is nonetheless recognizable by a casual observer (e.g., when label 100 is designed to serve as an overt deterrent to counterfeiting).

As is the case with thermally conductive layer 120, background layer 130 can be integral to substrate 110 (e.g., background layer 130 can be manufactured together with, or a part of, substrate 110). Moreover, background layer 130 can be applied well in advance, just before, or substantially simultaneously with the application of the indicium onto label 100. Background layer 130 can also be applied around the edges (and/or in between any open gaps) of the applied indicium in accordance with the principles of the present invention, rather than underneath it.

Finally, as shown in FIG. 1, label 100 includes adhesive layer 140. Adhesive layer 140 can be any suitable type of material that can be used to affix label 100 to a document or other product. For example, adhesive layer 140 can be a gum or pressure sensitive glue backing. Moreover, adhesive layer 140 can have a peel off plastic layer (not shown) that is removed immediately prior to the application of label 100 to the surface of a document or other product.

Instead of being applied to the surface of a document or other product, for example, label 100 can also be integrated into (i.e., manufactured as part of) the document or other product with which it is to be used. In this case, adhesive layer 140 may not be necessary. Additionally, it will be understood that, even when label 100 is not integrated into the receiving document or product, label 100 may be applied by some means other than adhesive layer 140. For example, label 100 may be sewn to the document or other product that it is to be used with, or attached by any other suitable method. The invention is not limited in this manner.

Figure 2:
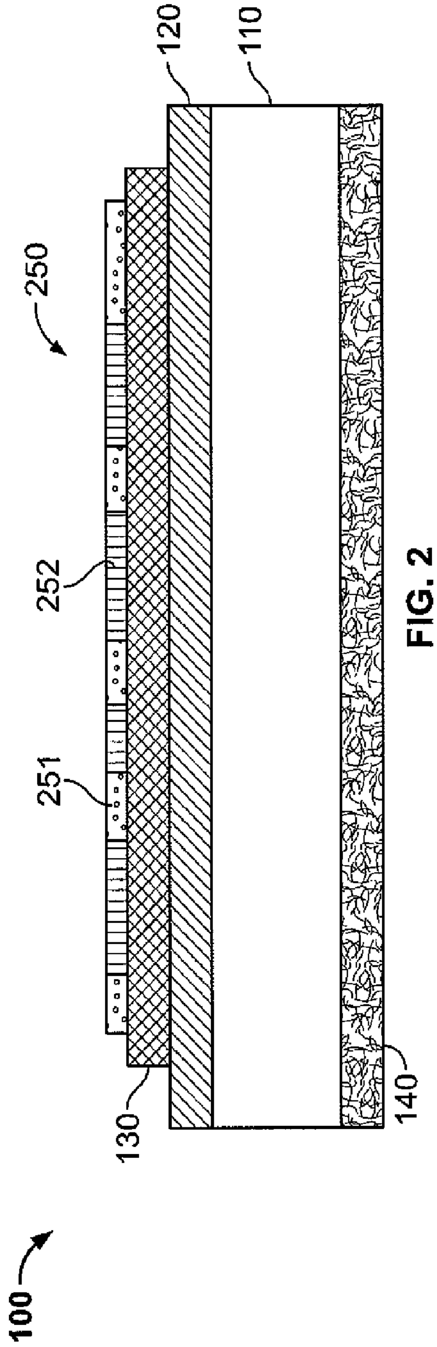
FIG. 2 is a cross-sectional side view of the label shown in FIG. 1 that shows an indicium applied to the surface of the label.

FIG. 2 is a cross-sectional side view of label 100 to which indicium 250 is applied (e.g., printed) in accordance with the principles of the present invention. It will be understood that, although indicium 250 is applied on top of background layer 130 in the embodiment of the present invention shown in FIG. 1, this is not mandatory. For example., as explained above, thermally conductive layer 120 can be located on top of indicium 250. The invention is not limited in this manner.

As shown in FIG. 2, indicium 250 includes a pattern of areas of varying emissivity 251 and 252. Although a particular pattern is shown in FIG. 2, persons skilled in the art will appreciate that indicium 250 may take the form of any suitable bar code (e.g., code 39 or PDF-417) or other machine readable code. Moreover, it should also be appreciated that indicium 250 does not necessarily include a machine-readable code, and may, for example, also include a human readable character or symbol.

To achieve patterns 251 and 252, indicium 250 uses two or more inks which preferably has a different spectral emissivity value than background layer 130, although this is not mandatory. The inks may be, for example, a black colored carbon-black ink and a black colored inorganic ink (preferably ink jet printing is used for both inks). In a preferred embodiment, indicium 250 is printed with a hot melt inkjet printing system and contains, for example, code 39 bar-code information. However, printing may be accomplished through any suitable method, including offset, ink jet, xerographic or press.

The inks used to make indicium 250 may be composed of, for example, a suitable carrier liquid containing a suspension, solution, or other composition of pigments and other materials of known spectral emissivity in either the total electromagnetic spectrum, or in a given portion of the spectrum. Carrier liquids may be based on water or hydrocarbon, including liquids such as alcohol, ethylene glycol, or others known in the ark of ink making. Furthermore, examples of materials with known emissivity values that are readily adapted to conventional printing processes include carbon, cobalt, copper, gold, manganese and silver.

Additionally, in accordance with the principles of the present invention, the inks used for indicium 250 preferably have the same or very similar visual appearance (e.g., apparent brightness, color and texture) as that of background layer 130. In this manner, indicium 250 is invisible to the naked eye, but readable by means of a scanner that is capable of detecting transitions of differential emissivity. Moreover, even if indicium 250 is visible to the naked eye, and/or capable of being copied by standard office equipment and scanners, the information contained in the variable emissivity code will not be so readable or capable of being copied. In particular, while copying a label 100 that uses a visible indicium 250 by conventional office equipment may appear to achieve the result of a copy that is similar to the original, the copy will nonetheless lack the required transitions of differential emissivity to maintain the information (or symbol) of indicium 250.

It will be understood that the inks used for providing indicium 250 can be printed or applied in any suitable manner to label 100. For example, these inks can be printed in complementary patterns in a single pass, such that the whole area of the mark is covered with one or the other ink. Alternatively, for example, a first ink can be printed over the whole area, allowed to dry, and then a second ink can be printed in the pattern on top of the first ink. Regardless of the manner of application, in a preferred embodiment, the indicium appears to be a solid pattern (e.g., a solid black marking) in the visible spectrum, but reveals pattern in a selected invisible range in which the two inks have a known emissivity differential.

It should also be understood that it is not mandatory for indicium 250 to be continuous across the surface of background layer 130. For example, indicium 250 may include gaps, or spaces, in between the areas of varying emissivity 251 and 252. In this case, for example, the emissivity value of background layer 130 can be used as part of the pattern (i.e., to add additional transitions of differential emissivity). Moreover, it will also be understood that indicium 250 may include only a single ink, in which case the emissivity value of background layer 130 could be used in conjunction with the emissivity value of indicium 250 to form the pattern of varying emissivity. The invention is not limited in this manner.

Figure 3:
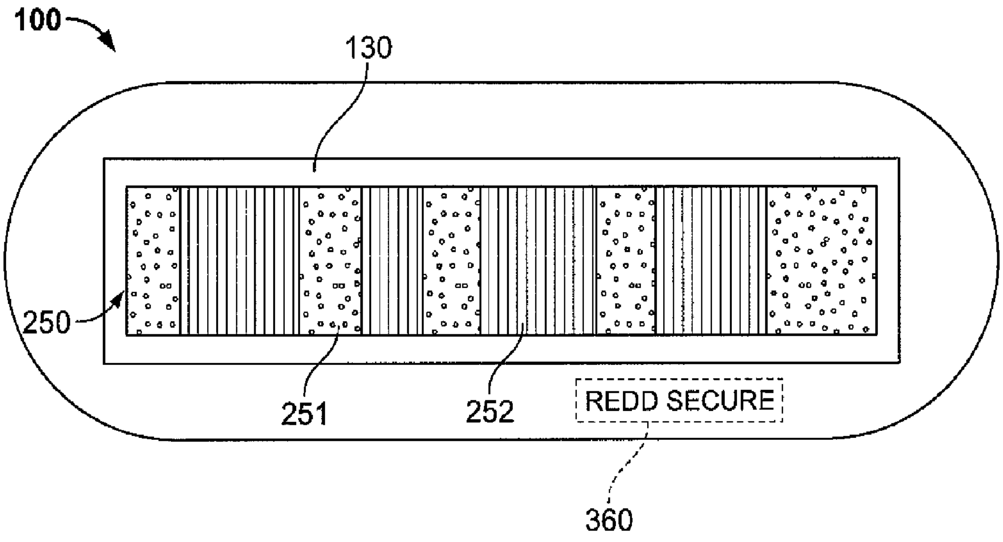
FIG. 3 is a top-view of the label shown in FIG. 2 which better illustrates the varying emissivity values of the applied indicium.

FIG. 3 is a top-view of the label shown in FIG. 2 which better illustrates the varying emissivity values of indicium 250 as detectable by a suitable scanner. As can be seen from FIG. 3, label 100 also includes an optional brand identification marking 360 that can be applied to label 100. It will be understood that marking 360 can be applied to any suitable location (e.g., on top of thermally conductive layer 120 if present) and in any suitable manner (e.g., by using an adhesive layer similar to adhesive layer 140, or being integral to label 100). Marking 360 provides visible writing that, for example, identifies the manufacturer of label 100 to an observer of label 100. Alternatively, mark 360 may identify the manufacturer of the document or product for which label 100 is being used. Persons skilled in the art will appreciate that the invention is not limited by the location or information content of marking 360, which may or may not be present in various embodiments of the present invention.

Figure 4:
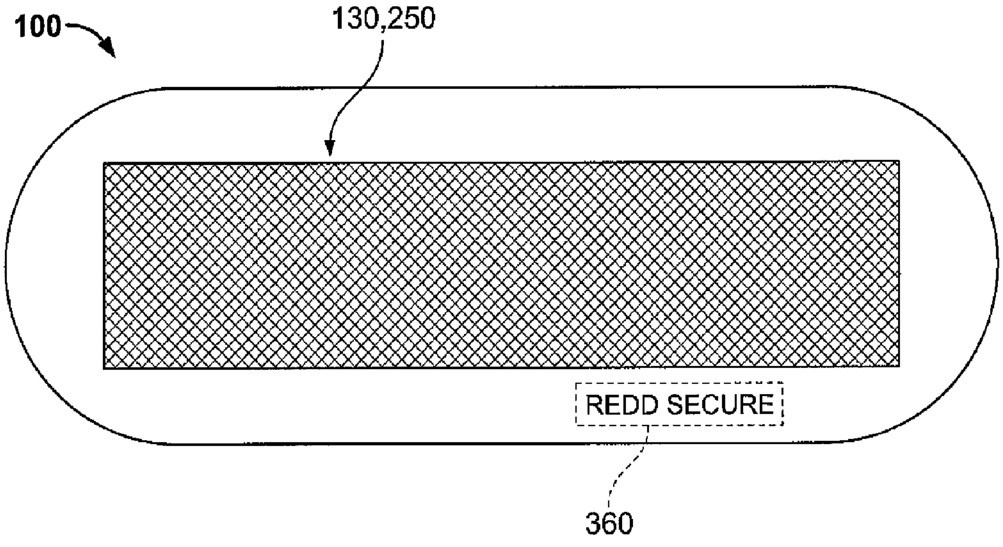
FIG. 4 is a top-view of the label shown in FIG. 2 which illustrates the visible appearance of the label to a naked eye.

FIG. 4 is a top-view of the label shown in FIG. 2 which illustrates the visible appearance of the label to a naked eye. In particular, as shown in FIG. 4, background layer 130 and indicium 250 appear to be a featureless area of uniform color and appearance with no discernable features. In this manner, whether it is a bar-code or other type of mark or symbol, indicium 250 will not be observable by the naked eye. In fact, the presence of any marking at all will likely not be known by an observer who is unfamiliar with the technology of the present invention.

It will be appreciated that, when "hiding" the presence of indicium 250 is not a concern, label 100 can be constructed such a naked eye can detect the patterns of indicium 250. Accordingly, in various embodiments of the present invention, for example, it is possible that background layer 130 and indicium 250 will not appear to be a featureless area of uniform color, but rather, have discernable features that serve to deter counterfeiters of a product.

Figure 5:
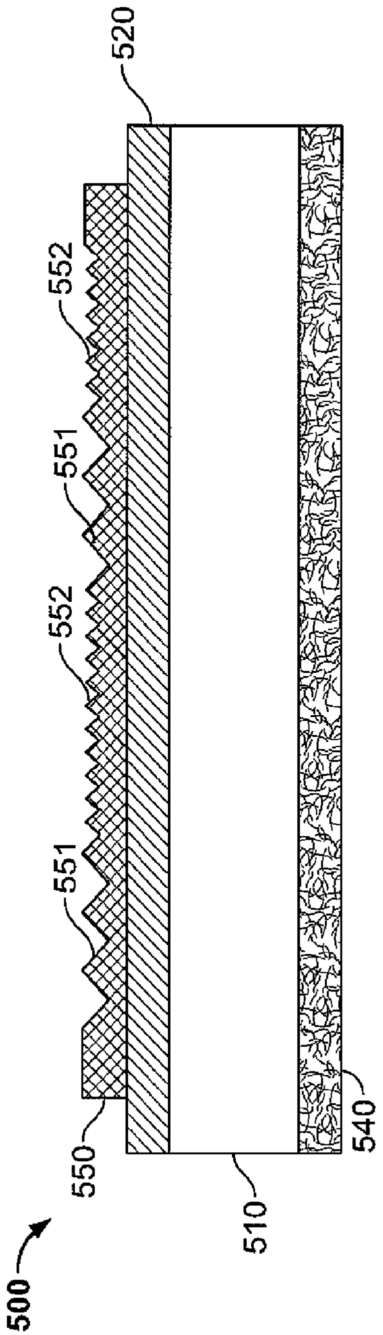
FIG. 5 is a cross-sectional side view of another embodiment of a label, with an applied indicium, constructed in accordance with the principles of the present invention.

FIG. 5 shows a label 500 that is substantially similar to label 100 described above. In particular, label 500 includes substrate 510, thermally conductive layer 520 and adhesive layer 540 which are similar to substrate 110, thermally conductive layer 120 and adhesive layer 140, respectively, as described above and illustrated in FIGS. 1-4.

Unlike indicium 250 of label 100 described above, however, indicium 550 of label 500 shown in FIG. 5 makes use of varying emissivity values as influenced by surface texture. In particular, the outermost layer (e.g., a background layer as described above) of label 500 is imprinted to create indicium 550 having areas of varying surface roughness 551 and 552. These areas can be created in any suitable manner. For example, areas 551 and 552 can be created by embossing with an electromechanical dot matrix printer (e.g., the Epson MX-80). This can be done without ink, as shown in FIG. 5, or, as explained below, with ink formulated to fix and retain the surface texture. Alternatively, raised printing can be created by means of high resolution ink jet printing which can print areas of varying dot density patterns using an ink formulated for raised lettering as known in the art. Optionally, a label with a metallic film surface can be embossed with different textures for this embodiment of the invention. It will be understood that while indicium 550 is shown to be located at the top layer of label 500, the invention is not limited in this manner.

Instead of imprinting indicium 550, an alternate composition of the special inks described above can also be used in accordance with the principles of the present invention to create areas of varying surface roughness. For example, inks that dry or cure with a predetermined surface texture can be used in order to create a surface of predetermined transitions of differential emissivity. Such inks include, for example, those that comprise dense suspensions of colorants, pigments, or other particulate materials such as ferric oxide.

In addition, a combination of the methods used in connection with labels 100 and 500 is also possible. For example, the surface of a label according to the invention may be embossed or physically textured before inking, or an ink may be embossed after drying to produce a desired emissivity.

Figure 6:
FIG. 6 shows a mailing envelope that uses a label according to the principles of the present invention for the purpose of providing postage paid or other information.

FIG. 6 shows a mailing envelope 670 that uses a label 100 according to the principles of the present invention for the purpose of providing postage paid or other information. It will be understood by persons skilled in the art that another label according to the invention (e.g., label 500) can also be used with envelope 670 without departing from the spirit of the present invention.

In one embodiment, the indicium (not shown in detail) of label 100 shown in FIG. 6 may include a machine-readable code that is used, for example, as a postage meter indicium which simply contains information relating to funds paid for postage or other relevant information. In other embodiments, information pertaining to the originating address of the sender, the time and date of sending, and/or other pertinent information may be included in the indicium. Alternatively, for example, the indicium of label 100 shown in FIG. 6 may serve as a "signature" mark, or symbol, that is designed to authenticate the identity of the individual or corporation sending the letter. In this case, it is contemplated that such a "signature" mark may be provided alone or in combination with postage paid or other relevant information. The invention is not limited by the particular information found in the indicium of label 100 used with mailing envelope 670.

Persons skilled in the art will appreciate that label 100 may be attached to envelope 670 in any suitable manner. For example, if label 100 includes an adhesive layer 140, then adhesive layer 140 can be used to attach label 100 to envelop 670. Alternatively, a glue or other type of adhesive can simply be applied to the bottom of label 100 immediately prior to its application to envelope 670. In yet other embodiments of the invention, label 100 may be constructed integral to envelope 670. For example, it is contemplated that envelopes be mass produced having labels 100 integrated into the envelope material. In this case, for example, each envelope can be sold with a pre-paid postage indicium that permits a user to mail the envelope via first class mail for up to a predetermined weight. Moreover, it is also possible for the various layers of a label 100 or 500 to be applied individually to envelope 670, at any time during or after the production of envelope 670. The invention is not limited in this manner.

Figure 7:
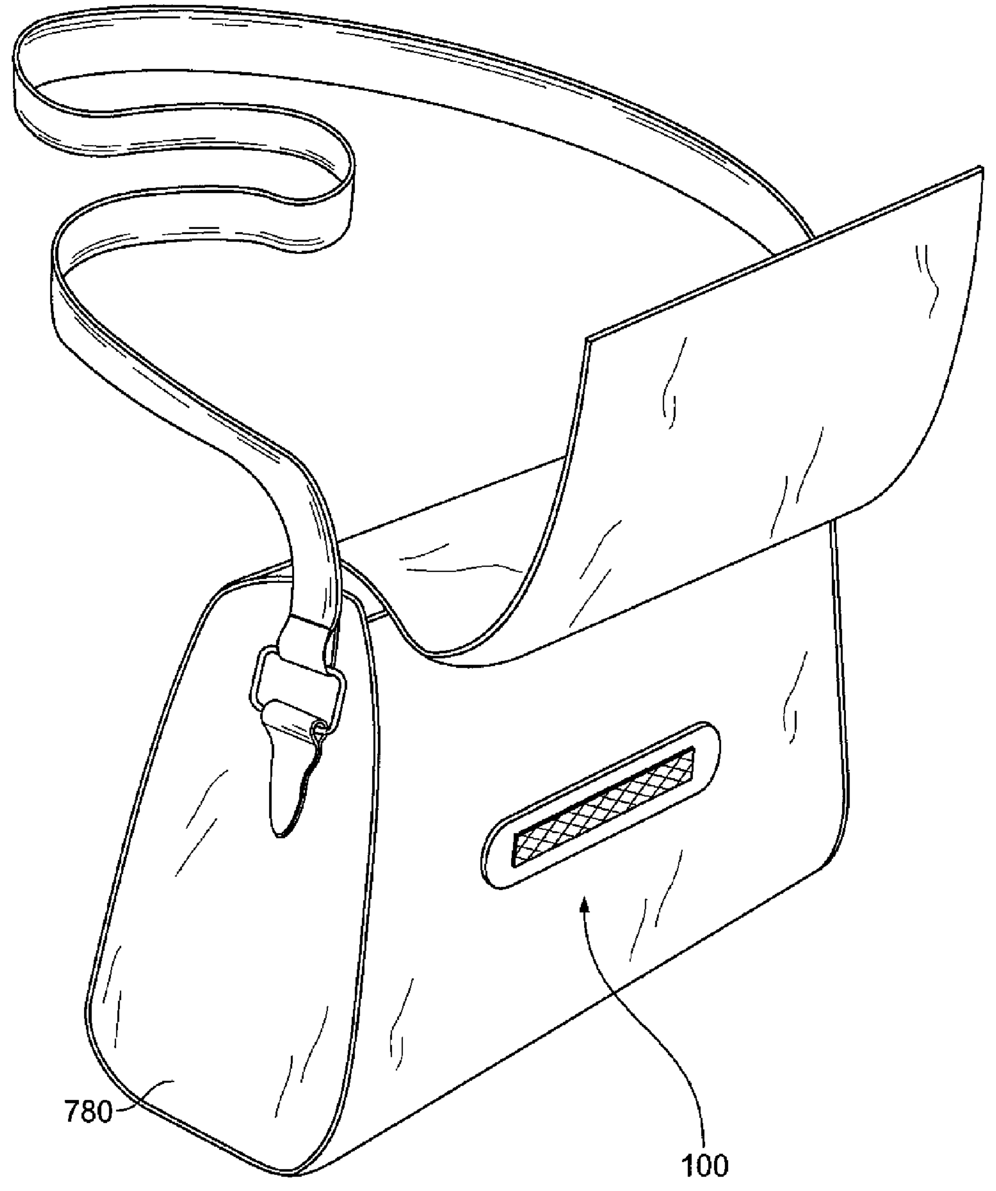
FIG. 7 shows a label in accordance with the principles of the present invention used for the purpose of providing authentication of a carrying bag.

FIG. 7 shows a carrying bag 780 that uses a label 100 for authentication or other purposes according to the principles of the present invention. It will be understood that label 100 shown in FIG. 7 (which could be replaced with a label 500 without departing from the spirit of the invention) may include any suitable information (e.g., purchase price, manufacturer information, etc.).

Label 100 can be located in any suitable place on the surface (or in the interior) of bag 780. For example, label 100 can be placed in an overt manner, such that counterfeiting may be deterred. In other embodiments, label 100 can be located such that label 100 is not readily observable (in which case the anticipation of a "hidden" label by potential counterfeiters may serve as an equally effective deterrent). Moreover, label 100 can be applied to bag 780 in any suitable manner. As with label 100 of FIG. 6, for example, label 100 of FIG. 7 may be applied to bag 780 using adhesive layer 140 (if present), by being sewn onto bag 780 or constructed integral to bag 780. It will also be understood that it is possible for the various layers of a label 100 or 500 to be applied individually to bag 780, at any time during or after the production of bag 780

Persons skilled in the art will appreciate that the labels described above in accordance with the principles of the present invention are provided as illustrations of the invention only, and that the invention is not limited by the specific configurations described above. For example, while labels 100 and 500 use specific types of indicium 250 and 550, respectively, the invention is not limited in this manner. Rather, any suitable indicium (e.g., whether created using inks, areas of varying surface textures, or other means) may be used in conjunction with the labels described herein without departing from the spirit of the present invention. Additionally, while certain uses for labels 100 and 500 are described above, other uses are also within the scope of the invention. These other uses may include, for example, providing hidden coding of driver's licenses to distinguish authentic licenses from counterfeits, hospital identification tags and the like.

Moreover, it will also be understood by those skilled in the art that the various layers of a label according to the invention may be manufactured together, allowing the label to be applied as a single item to a document or other product. However, as explained above, it is also contemplated that some or all of these layers be applied individually to a document or other product, and that in certain embodiments, some of these layers be excluded (or combined with other layers). The invention is not limited in this manner.

The above described embodiments of the present invention are presented for purposes of illustration and not of limitation, and the present invention is limited only by the claims which follow.

What is claimed is:

1. A label comprising:
a substrate;
an indicium located above the substrate, the indicium comprising:
a first printed ink comprising a first thermal emissivity value; and
a second printed ink comprising a second thermal emissivity value different from the first thermal emissivity value; and
a separate background layer located between the substrate and the indicium and comprising a third thermal emissivity value, wherein the first printed ink, the second printed ink, and at least a portion of the background layer are configured to encode information based on the first thermal emissivity value, the second thermal emissivity value, and the third thermal emissivity value, and wherein at least another portion of the background layer extends beyond the first printed ink and the second printed ink.

2. The label of claim 1 wherein the substrate is part of a product to which the label is applied.

3. The label of claim 1 wherein optical properties of the indicium are substantially similar to optical properties of the substrate.

4. The label of claim 1 wherein the indicium comprises at least one human readable character.

5. The label of claim 1 further comprising:
a thermally conductive layer located on the substrate.

6. The label of claim 5 wherein the thermally conductive layer is transparent.

7. The label of claim 5 wherein the thermally conductive layer is applied on top of the indicium.

8. The label of claim 5, wherein optical properties of the indicium are substantially similar to optical properties of the thermally conductive layer.

9. The label of claim 1, wherein the third thermal emissivity value is different from each one of the first thermal emissivity value and the second thermal emissivity value.

10. The label of claim 1, wherein the background layer at least one of surrounds an edge of the indicium and fills in a gap of the indicium.

11. The label of claim 1, wherein the first printed ink, the second printed ink, and the at least a portion of the background layer are configured to encode the information based on differences between the first thermal emissivity value, the second thermal emissivity value, and the third thermal emissivity value.

12. A label for use with a product, the label comprising:
a substrate that is integrated into a product;
an indicium, located above the substrate, comprising:
a first printed ink comprising a first thermal emissivity value; and
a second printed ink comprising a second thermal emissivity value different from the first thermal emissivity value; and
a background layer residing between the substrate and the indicium and comprising a third thermal emissivity value, wherein the first printed ink, the second printed ink, and at least a portion of the background layer are configured to encode information based on the first thermal emissivity value, the second thermal emissivity value, and the third thermal emissivity value, and wherein at least another portion of the background layer extends beyond the first printed ink and the second printed ink.

13. The label of claim 12 wherein optical properties of the indicium are substantially similar to optical properties of the substrate.

14. The label of claim 12 wherein optical properties of the indicium are substantially similar to optical properties of the background layer.

15. The label of claim 12 wherein the indicium comprises at least one human readable character.

16. The label of claim 12 further comprising:
a thermally conductive layer that is applied to the substrate.

17. The label of claim 16 wherein the thermally conductive layer is transparent.

18. The label of claim 16 wherein the thermally conductive layer is applied on top of the indicium.

19. The label of claim 12, wherein the third thermal emissivity value is different from each one of the first thermal emissivity value and the second thermal emissivity value.

20. The label of claim 12, wherein the background layer at least one of surrounds an edge of the indicium and fills in a gap of the indicium.

21. The label of claim 12, wherein the first printed ink, the second printed ink, and the at least a portion of the background layer are configured to encode the information based on differences between the first thermal emissivity value, the second thermal emissivity value, and the third thermal emissivity value.

22. A method for producing a label, the method comprising:
providing a substrate;
applying a background layer to the provided substrate;
locating an indicium on the applied background layer, the indicium comprising:
a first printed ink comprising a first thermal emissivity value; and
a second printed ink comprising a second thermal emissivity value different from the first thermal emissivity value, wherein:
the applied background layer comprises a third thermal emissivity value; and
the first printed ink, the second printed ink, and at least a portion of the applied background layer together form a two dimensional pattern that encodes information based on the first thermal emissivity value, the second thermal emissivity value, and the third thermal emissivity value.

23. The method of claim 22 wherein the providing the substrate comprises applying the substrate to a surface of a product that is to receive the label.

24. The method of claim 22 wherein the providing the substrate comprises using a portion of a product that is to receive the label as the substrate.

25. The method of claim 22 further comprising:
applying a thermally conductive layer onto the provided substrate.

26. The method of claim 22 wherein the third thermal emissivity value is different from each one of the first emissivity value and the second emissivity value.

27. The method of claim 22, wherein the background layer is applied at least one of to surround an edge of the located indicium and to fill in a gap of the located indicium.

28. The method of claim 22, wherein the two-dimensional pattern encodes the information based on differences between the first thermal emissivity value, the second thermal emissivity value, and the third thermal emissivity value.

* * * * *